May 19, 1936. H. E. COLLINS 2,041,231
HOLDER FOR SNELLED FISHING HOOKS
Filed Nov. 20, 1934 2 Sheets-Sheet 1
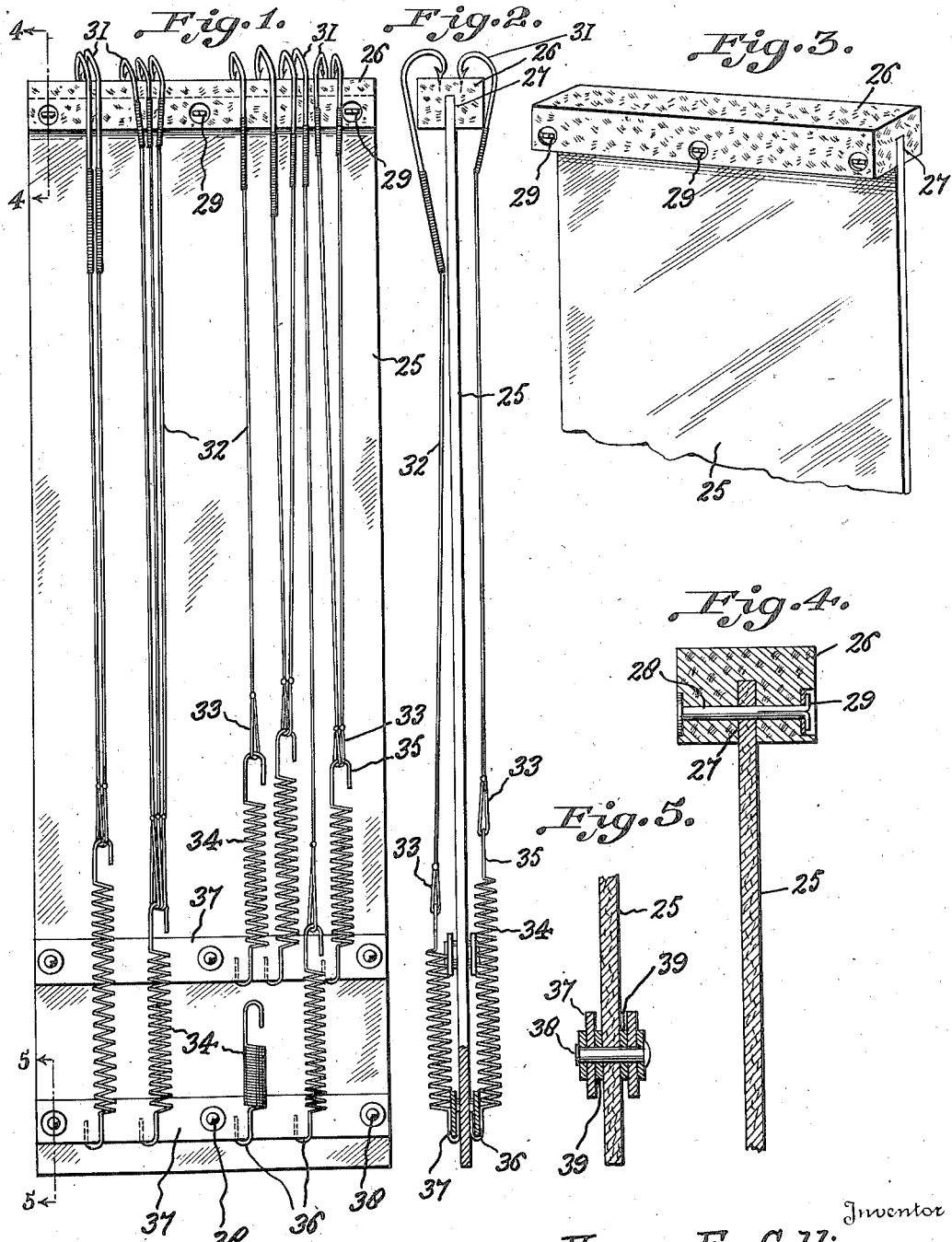
Inventor
Henry E. Collins
By Mawhinney & Mawhinney
Attorneys.

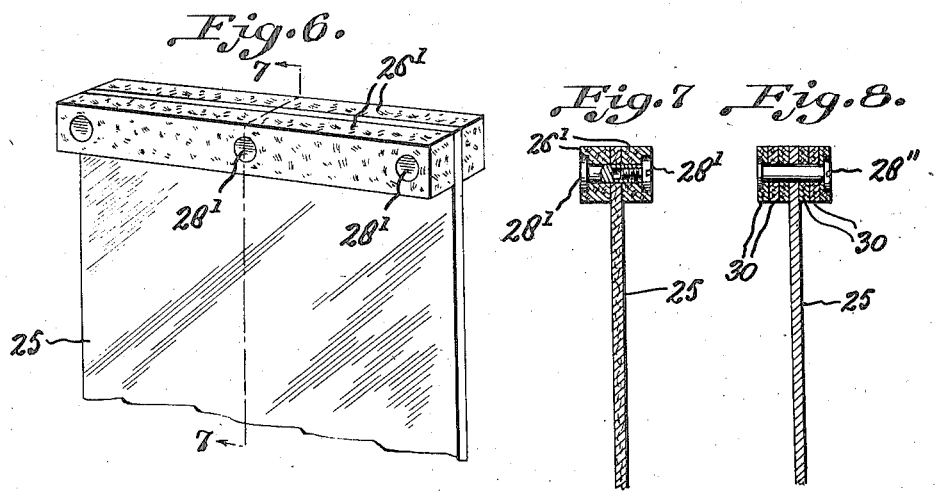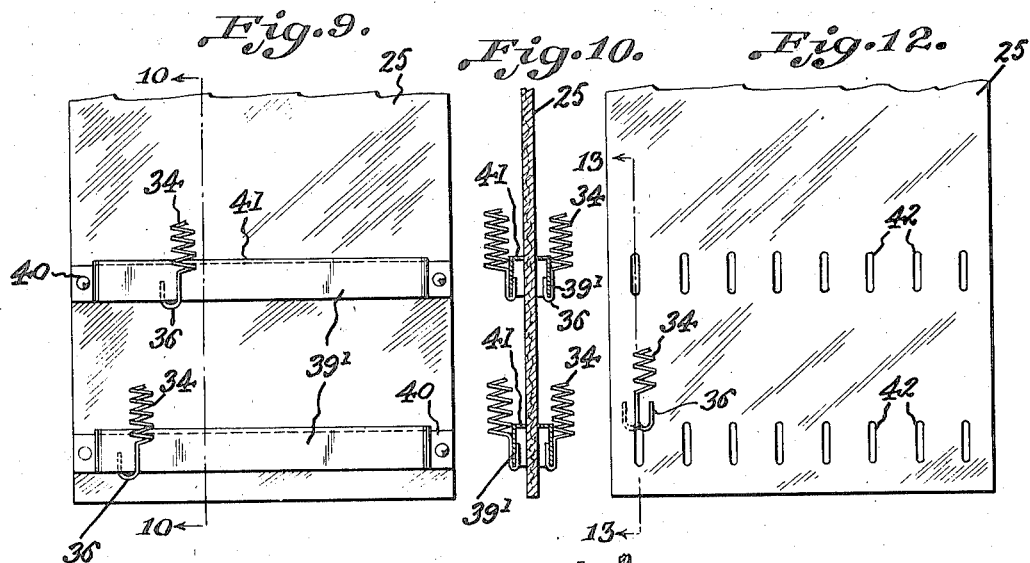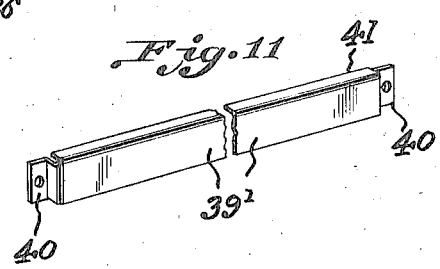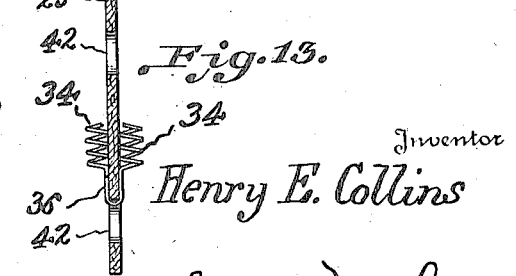

Patented May 19, 1936

2,041,231

UNITED STATES PATENT OFFICE 2,041,231

HOLDER FOR SNELLED FISHING HOOKS

Henry E. Collins, Dunmore, Pa.

Application November 20, 1934, Serial No. 753,935

7 Claims. (Cl. 43—32)

The present invention relates to fishing tackle and the like, and more particularly to a holder for snelled fish hooks.

In a fishing kit or supply box one keeps numerous objects including fish hooks of various sizes and types, and to prevent injury to the user and to prevent the hook becoming entangled with one another and with the lines and other accessories the present invention provides an improved snelled fish hook holder.

The holder of this invention also accommodates, in a small space, a large number of fish hooks of various sizes and with snells or guts of various lengths and admits easy access to the holder and to the hooks; holds the snells taut; eliminates all dangling, loose and exposed hook parts; and provides spring or tension devices which are of uniform size and length, which may accommodate each one or more hook snells and which are individually adjustable on the holder to provide the required tension on the snells and to accommodate snells of different lengths.

Another object of this invention is to provide a hook guard and support which is renewable and which may be of suitable spongy or like material within which the point of the hook may be embedded; admitting substitution of a new guard and support when the prior one becomes broken and disintegrated by repeated penetration and withdrawal of the hooks.

Another object of the invention is to provide a holder with a hook encasing and holding head or end piece for hooks of various types and sizes; to also provide a plurality of separate tension hook devices which may be kept separate from the holder and used one at a time as the fish hooks are applied to the holder, and to provide on the holder cooperating means for securing the tension hook devices at different distances from the head piece depending upon the different lengths of the snells to maintain the snells taut on the holder.

A further object of the invention is to provide a tension device which is separable from the holder so that when the tension device is not in use it may be stored away separately so that the holder has no projecting or dangling parts, and to provide a tension device which is so constructed that it may be quickly applied both to the snells and to the holder in the desired adjusted position.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of one form of fish hook holder embodying the features of this invention, showing a plurality of different sized fish hooks thereon with snells of different lengths and secured singly and in groups on the holder.

Figure 2 is an edge view of the same with the lower part in section.

Figure 3 is a fragmentary upper end perspective view of the holder with the fish hooks removed and showing means for detachably securing the hook receiving element to the body plate of the holder.

Figure 4 is an enlarged transverse section taken through the same on the line 4—4 of Figure 1.

Figure 5 is a transverse fragmentary section taken through the lower portion of the body plate on the line 5—5 of Figure 1, showing one form of the releasable holding means for the tension devices.

Figure 6 is a fragmentary perspective view of the upper end of the holder, showing a slight modification in the construction of the hook receiving element.

Figure 7 is a transverse section therethrough on the line 7—7 of Figure 6.

Figure 8 is a like view, showing a slight modification in the securing means for the hook receiving element.

Figure 9 is a fragmentary side elevation of the lower end of the holder showing a modified form of the tension device holding means.

Figure 10 is a transverse section on the line 10—10 of Figure 9.

Figure 11 is a detail perspective view of one of the modified holding means of Figure 9.

Figure 12 is a fragmentary side elevation of the lower end of the holder showing another modification of the tension device holding means, and Figure 13 is a transverse section on the line 13—13 of Figure 12.

Referring to the drawings, and first to the structure shown in Figures 1 to 5, the holder comprises a body plate 25 which may be of any suitable length, width and thickness, and may also be made of any suitable material, such as fiber, metal, wood or the like. This body plate 25 is provided on one end, shown as the upper end in the drawings, with a fish hook receiving element 26 which is of suitable construction and material to receive the ends or prongs of fish hooks for not only holding the hooks to the end portion of the body plate 25, but also to encase or house the points of the hooks and prevent contact thereof with the hands and surrounding objects. This hook receiving element 26 may be of spongy material of any suitable character, and is disclosed in the present instance as comprising cork. The hook receiving element 26 may be in the form of a single strip of cork provided at its under side with a longitudinal central slot 27 of sufficient size to receive therein the adjacent end of the body plate 25. The strip or receiving element 26 may be permanently attached to the body plate by an adhesive or any other suitable means, but the element 26 is preferably detachably mounted on the body plate 25 by means of split pins 28, such as shown in Figure 4, wherein the ends 29 of the pins may be turned over against the element 26 after the pins are passed transversely through the element 26 and through the adjacent end portion of the body plate 25.

The opposite ends of the pins 28 are preferably countersunk in the sides of the cork strip or element 26 so as not to protrude and to prevent catching of the holder on surrounding objects.

As shown, the hook receiving element 26 is centrally disposed on the upper end of the plate so as to project substantially equally from the opposite sides of the plate. This is for the purpose of accommodating groups of hooks which may be disposed at opposite sides of the plate but the double feature of the holder may of course be eliminated if it is desired to utilize but one side of the body plate 25. As shown in Figures 6, 7 and 8, this hook receiving element may comprise separate elements or strip portions 26' which are disposed against the opposite side faces of the body plate 25 with their outer ends more or less flush with the adjacent outer end portion of the body plate. These strip portions are secured to the plate by removable screws 28' which may be of the two part inter-threaded sectional structure shown in Figure 7. By means of the fastening devices 28' the strips of the element 26' may be easily removed from the body plate 25 for the renewal of the element when the same becomes disintegrated or broken incident to use.

In Figure 8, a removable fastening device 28'' may be used and which comprises a bolt portion having a threaded washer on its outer end for coupling the element to the body plate. In this instance the element comprises laminations of cork or other spongy material as shown at 30, and these are arranged in any suitable number of layers at opposite sides of the body plate to build up the hook receiving element.

The holder is adapted to support a relatively large number of snelled fish hooks wherein each is provided with a hook 31 adapted to engage at its point in the holding element 26 and with the shank of the hook extending lengthwise and toward the adjacent side of the plate 25. The shank of the hook 31 carries a snell or gut 32 having upon its free end a loop 33 and the snell 32 is adapted to be held taut along and adjacent to the side of the body plate 25. The holder is provided with a plurality of tension devices 34. Each tension device may be in the form of a coil spring having hooks 35 and 36 at its opposite ends and wherein the hooks are disposed at substantially right angles to each other and with one hook offset radially from the axis of the spring 34 as shown to advantage in Figure 2. The hook 35 is suitably proportioned to receive one or more snell loops 33, as shown in Figure 1 and preferably lies in a plane substantially parallel to that of the body plate 25 to eliminate lateral projections from the holder.

The other hook 36, is preferably disposed to extend inwardly toward the plate 25 and is selectively engaged with releasable holding means 37 carried upon the body plate 25 at each side thereof, as shown in Figure 3. In the construction shown in Figures 1 and 2, these releasable holding means 37 may comprise flat strips disposed transversely across the sides of the body plate 25 and spaced lengthwise of the body plate to provide holding means at different distances from the hook receiving element 26 and to thus accommodate snells 32 of different lengths. These strips 37 may be secured to the body plate 25 in any suitable manner, such as by rivets 38, and spacers or washers 39 may be introduced between the strips 37 and the adjacent sides of the body plate 25 and are of less width or diameter than the width of the strips 37 to provide grooves or channels behind the lower edges of the strips 37 to receive the free ends of the hooks 36. Preferably, all of the tension devices 34 are of the same construction and size so that it is unnecessary to make any definite selection among a number of the tension devices when securing a fish hook to the holder. The holding means for the tension devices are thus selectively used as in applying a tension device to a snell 32, the hook 35 is first engaged with the loop 33 of the snell and the lower end hook 36 is then drawn downwardly to tighten the snell and is engaged with the adjacent and desired holding means 37, depending upon the length of the snell and the tension under which it is desired to place the same.

The tension devices 34 may be carried in a separate container, such as a small box or the like, so that the tension devices may be used and applied to the holder only when it is desired to secure hooks in place. Thus, by providing detachable tension devices the holder has no dangling or loose parts, such as hooks, springs or the like adapted to become entangled with fishing lines and other tackle which may be carried in the kit.

The holding means may be of the construction, shown in Figures 9, 10 and 11, wherein metallic rust proof strips 39 are used and provided with offset attaching lugs 40 at opposite ends riveted or otherwise secured to the adjacent side of the body plate 25. To hold the strips 39 from collapsing against the body plate, the upper edge of each strip 39 may be provided with an inturned flange or skirt 41 of sufficient depth to rest across the adjacent side of the body plate and support the strip 39 against crushing. The hooks 36 at the lower end of the tension devices 34 are adapted to engage beneath and about the lower edges of the strips 39, as shown.

In the modification shown in Figure 12, the releasable holding means for the tension devices 34 comprises lengthwise spaced apart transverse rows of slots 42 formed in the body portion 25 and which are disposed with their axes longitudinal of the body plate or portion and of sufficient length to receive the upturned ends of the hooks 36 therethrough in positioning and removing the tension devices. In this instance the open ends of the hooks 36 which are inserted through the opposite sides of the body plate 25 may overlap laterally through the upper portion of the adjacent slot 42, as shown to advantage in Figures 12 and 13. The hooks 36 in this instance may be relatively flat so as not to project beyond the opposite sides of the body plate 25, as shown in Figure 13.

It will thus be noted that this holder provides tension devices 34 each of which may support one or more snells, and each of which may be selectively and releasably engaged with the holding means 37, in Figures 1 and 2, the holding means 39 shown in Figures 9, 10 and 11, and with the holding means 42, shown in Figures 12 and 13. Thus, the tension device 34 may be selectively and releasably connected to the body plate 25 in order to hold the snell 32 of the fishing hook taut whether the snell be long or short, and also to hold the snell with the desired degree of tension within practical limits.

The hook receiving element 26 is also renewable so that the body part and other portions of the holder need not be discarded when the spongy hook receiving element becomes disintegrated or worn out with use as a new element 26 may be readily substituted on the upper end of the body plate.

In making the tension devices or springs 34 all of uniform size and length, fishing hooks may be more quickly and easily applied and adjusted to the holder and less care and attention are required in the mounting of the hooks, and the detachable features of the tension devices is such that when they are not actually in use and engaged with snells they are removed from the body plate and separately stored away in a suitable container or the like. Of course, in grouping a number of snells on the same hook 35 of a tension device, the snells must be of substantially the same length.

It is obvious that various changes and modifications may be made in the details of construction and design of the above specifically described embodiment of this invention without departing from the spirit thereof, such changes and modifications being restricted only by the scope of the following claims.

What is claimed is:—

1. A holder for snelled fishing hooks, comprising a body plate, a combined hook supporting and point encasing element of spongy material mounted on one end portion of the body plate for receiving and enclosing the ends of fish hooks, and detachable tension devices for engagement with the looped ends of the snells of the hooks, said tension devices and the body plate having cooperating means for adjustably attaching the tension devices to the body plate at different points on the latter relative to the different lengths of the snells and remote from said hook supporting element to maintain the snells of the hooks taut, said tension devices extending completely across said means.

2. A holder for snelled fishing hooks, comprising a body plate, a hook supporting and point penetrable element detachably fitting on one end of said body plate, means for detachably securing the element to the plate, said element being adapted to receive a plurality of fish hooks thereagainst with the points penetrating the element and with the snells of the hooks extending lengthwise against the side of the body plate, and engaging strips secured transversely across the opposite end portion of the plate in spaced apart relation lengthwise of the plate and having grooves in their lower edges, and separate tension devices for detachable engagement with the snells of the fish hooks and provided with open hooks at their lower ends for detachable and selective engagement with said transverse strips in the grooves thereof.

3. A holder for snelled fishing hooks, comprising a body plate, a strip of cork having a recess in its under side adapted to receive the end portion of the body plate therein, removable securing devices extending transversely through the strip and the interposed end portion of the plate, said cork strip being adapted to receive a plurality of hook points therein for supporting the hooks and encasing the points thereof, tension devices for detachable engagement with the snells of the hooks, and adjustable cooperating fastening devices between the opposite end portion of the body plate and said tension devices for adjustably attaching the tension devices to the plate in adjusted position with respect to the length of the snells, said cooperating fastening devices between the plate and the tension devices being so formed as to facilitate removal of the tension devices from the plates, when the corresponding hooks are removed from the holder.

4. A holder for snelled fishing hooks comprising a body plate, a strip of spongy material detachably secured on one end portion of the plate and projecting from the opposite sides thereof, said spongy strip being adapted to receive the points of fish hooks penetrating the strip for housing the points and with the fish hooks disposed at opposite sides of the plate, a plurality of tension devices detachably connected to the snells of the hooks and having open hook portions at their free ends, and selective hook engaging means on the opposite end portion of the plate for receiving the hooks of the tension devices to releasably hold the same in adjusted position on the plate relative to the lengths of the snells, said open hook portions extending completely across said means.

5. A holder for snelled fishing hooks, comprising a body plate, a detachable head strip of spongy material secured over one end of the plate for receiving the points of fish hooks disposed against the side of the plate, a plurality of transverse strips secured across the opposite end portion of the plate in spaced relation lengthwise of the plate and having spacing means between the lower portions of the strips and the plate to provide grooves behind the lower edges of the strips, and a plurality of tension springs having snell engaging hooks at one end for engaging the snells of the fishing hooks and having anchoring hooks at their opposite ends for selective engagement in the grooves of the transverse strips to maintain snells of different lengths taut on the holder.

6. A holder for snelled fishing hooks, comprising a body plate, a strip of spongy material secured across one end portion of the plate for receiving the points of fish hooks therein, a plurality of transversely disposed strips having inwardly offset lugs at opposite ends secured to the body plate and said strips having inturned longitudinal flanges at their inner edges for engagement with the adjacent face of the plate to hold the intermediate portions of the strips from flattening against the plate, and a plurality of tension springs having hooks at one end for removable engagement with the snells of the fish hooks and having anchoring hooks at their other ends for engagement selectively about the outer free edges of and completely across the longitudinal face of said transverse strips.

7. A holder for snelled fishing hooks, comprising a body plate, a spongy head piece mounted on the body plate for receiving the points of fish hooks, a plurality of tension devices removably engaging the snells of the fish hooks and having anchoring hooks at their free ends and selectively engageable strips secured transversely across the other end portion of the body plate and having inwardly offset attaching lugs for holding the strips in spaced relation from the plate for the reception of the open ends of the anchoring hooks therein, said strips having reinforcing flanges at their inner edges adapted to engage the body plate for holding the strips in spaced relation from the plate and strengthening the strips under tension of the devices.

HENRY E. COLLINS.